99645

ALEXANDER CRUMBIE
Imp. in BAKERS REEL OVENS

PATENTED FEB 8 1870

Alexander Crumbie

Witnesses.
John R. Treadwell
A. H. Bowman

ALEXANDER CRUMBIE
Imp. in
BAKERS REEL OVENS

Alexander Crumbie

Witnesses.
Ohn R. Treadwell
A. H. Bowman

United States Patent Office.

ALEXANDER CRUMBIE, OF JERSEY CITY, NEW JERSEY.

Letters Patent No. 99,645, dated February 8, 1870.

OVEN.

The Schedule referred to in these Letters Patent and making part of the same

*To all whom it may concern:*

Be it known that I, ALEXANDER CRUMBIE, of Jersey City, in the county of Hudson, and State of New Jersey, have invented certain new and useful Improvements in Bakers' Reel-Ovens; and I do hereby declare that the following is a full and correct description thereof, reference being had to the accompanying drawings, and to the letters of reference thereon.

My improvements relate to that class of bakers' ovens commonly called "reel-ovens," in which is a series of swinging pans or bread-holders, suspended from the arms of a reel within a baking-chamber, supplied with products of combustion from an adjacent furnace, the reel being rotated as required, to bring the swinging-pans, in turn, to the mouth of the oven, to be discharged and recharged by the ovensman.

In these ovens, the reel is generally operated by a worm, gearing into a worm-wheel fast upon the reel-shaft outside the oven, the worm being turned by a hand-crank, or by power applied by a belt and tight and loose pulleys, or a pulley-clutch, the power being thrown on or off by a belt-shifter or clutch-shifter, operated by the ovensman.

In working these reel-ovens as rapidly as required in baking crackers, it is difficult, in practice, to stop the bread-holder at the proper place, to be discharged and recharged, by the belt or clutch-shipper, the bread-holders being either moved too far, or not far enough, requiring the reel to be moved again backward or forward, as the case may be, to get the bread-holder in proper position for charging or discharging. This occasions a loss of time, which, being of such frequent occurrence, becomes, in the aggregate, a serious impediment to the successful working of the oven.

The nature of my invention consists in providing a remedy for the above-mentioned defect in the construction of bakers' reel-ovens, by combining, with the mechanism for rotating the reel, an automatic stop-mechanism, for stopping the reel and bread-holders at the proper point for charging and discharging them.

In the accompanying drawings, which illustrate my invention, as applied to the form of reel-oven mechanism in common use—

Figure 1:
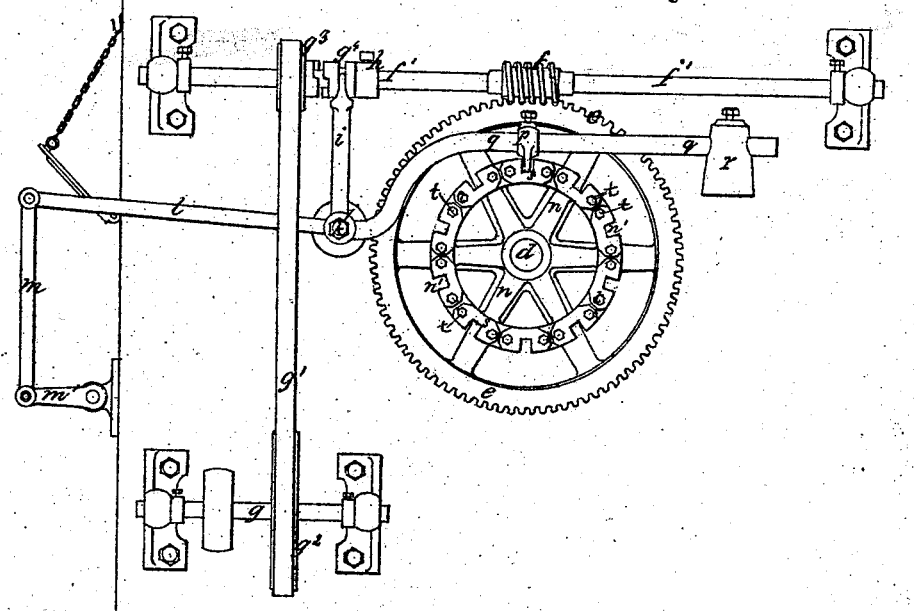

Figure 1 represents a side elevation of the oven, with the mechanism for operating the reel and bread-holders.

Figure 2:
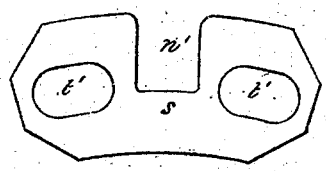

Figure 2, an enlarged plan view of one of the adjustable stops.

Figure 3:
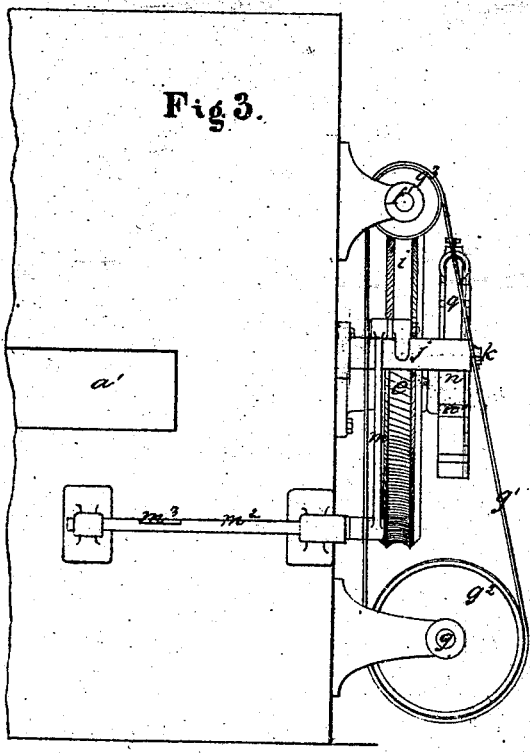

Figure 3, a partial front elevation, showing the mechanism for operating the reel.

Figure 4:
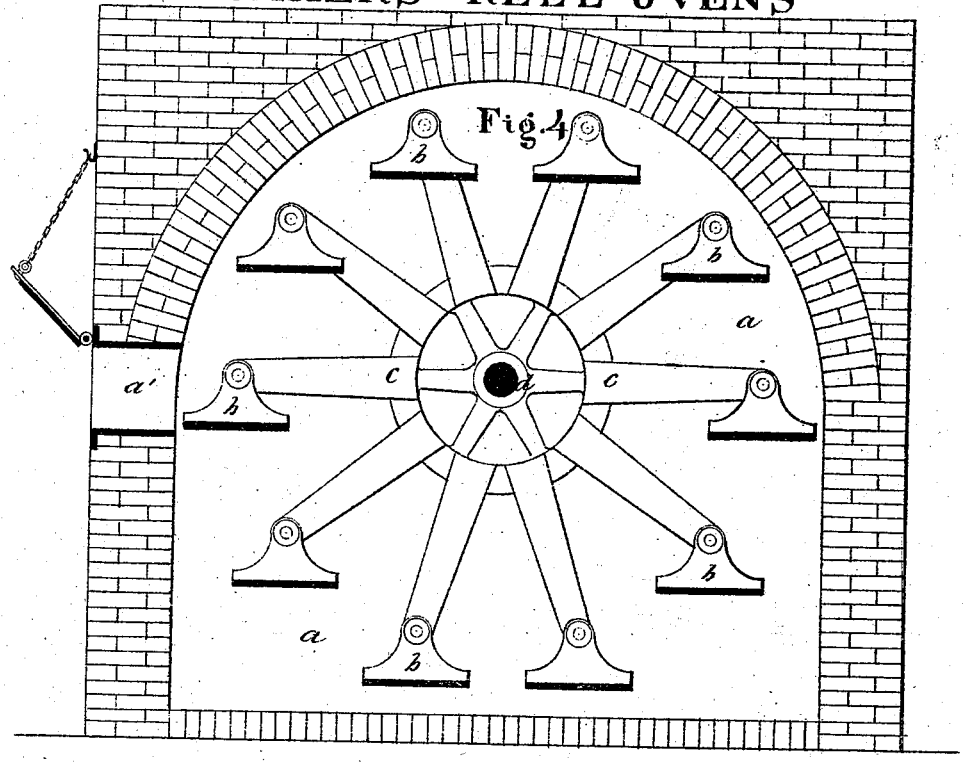

Figure 4, a transverse section of the baking-chamber, omitting the usual furnace below.

Figure 5:
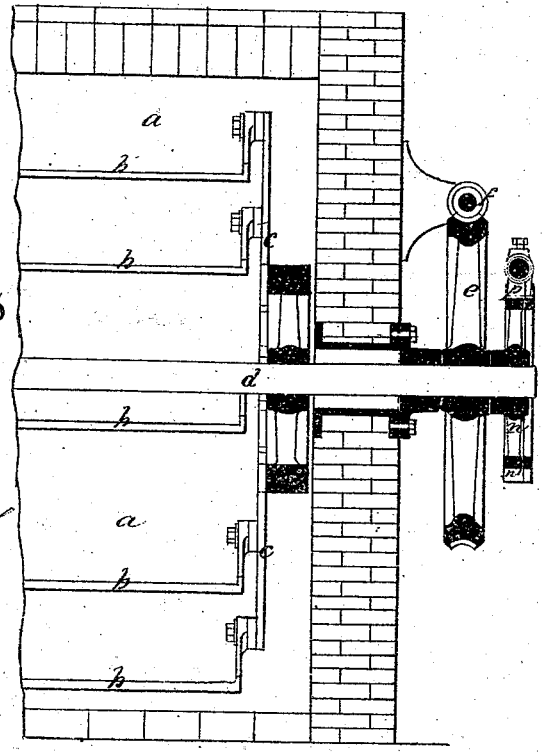

Figure 5, a partial longitudinal section of baking-chamber, reel, and reel-shaft, and mechanism for operating it.

Letter $a$ represents the baking-chamber or oven.
$a'$, the oven mouth.
$b$, the bread-holders.
$c$, the reel.
$d$, the reel-shaft.
$e$, a worm-wheel, fast to the reel-shaft, and driven by a worm, $f$, fast to the rotating shaft $f'$, which receives its motion from a countershaft, $g$, by a belt, $g^1$, driven by a pulley, $g^2$, fast to the countershaft, and driving a clutch-pulley, $g^3$, loose on the worm-shaft $f'$ and connected with it, when required to rotate the worm, by a clutch, $g^4$, sliding upon the worm-shaft, and connected therewith by a spline, as usual. An adjustable collar serves to keep the clutch in place.

The clutch $g^4$ is moved by a forked clutch-shipper, $i$, which is an arm, projecting upward from a hollow rocking-hub or sleeve, $j$, pivoted upon a stud-pin, $k$, which projects from the side wall of the oven.

The clutch-shipper is moved to engage the clutch with the clutch-pulley, by an arm, $l$, attached to the hub of the clutch-shipper at one end, and projecting forward to the front of the oven, where it connects, by a link, $m$, with the arm $m^1$, of a rock-shaft, $m^2$, in front of the oven, below the mouth, which rock-shaft is operated by the treadle $m^3$.

So far, this description relates to the mechanism for starting and moving the reel and bread-holders. I will now proceed to describe the mechanism for automatically stopping the reel, as each bread-holder arrives at its proper place at the oven mouth.

Upon the reel-shaft, outside of the oven, is an index-wheel, $n$, having as many notches, $n'$, in its periphery as there are bread-holders, the notches corresponding, in division, with the bread-holders carried by the reel.

The periphery of the index-wheel is turned smooth between the notches, so that the dog $p$ may rest thereon, while the index-wheel is turning.

The dog or wiper $p$ is affixed to an arm, $q$, which is attached at one end to the hub of the clutch-shipper, and projects over the index-wheel beyond the dog, having a weight, $r$, upon the other end, sufficient to disengage the clutch-shipper from the clutch-pulley whenever the dog drops into one of the notches of the index-wheel, the notches being made sufficiently deep to permit of the necessary movement of the parts.

Owing to the size of the reel, imperfections of workmanship, and warping of the reel-arms and bread-holders, a regularly-divided notched index-wheel will not always correspond with the bread-holders, so as to stop each at the right place at the oven mouth, and, therefore, the notches in the index-wheel are made wider than the width required for the dog, and a series of adjustable notched plates, $s$, with notches corresponding to the dog, is secured to the side of the index wheel, by screws $t$, passing through adjusting-slots $t\ t'$, fig. 2, in the adjustable plates.

The index-wheel should be secured to the reel-shaft, and the notched plates adjusted in such manner that each bread-holder will be stopped at a point a little above the level of the mouth-plate whenever the dog drops into the corresponding notch.

The operation of the above-described mechanism for moving and stopping the bread-holders is:

That when the ovensman desires to remove a bread-holder from the oven mouth, and to bring the next in place, he presses with his foot upon the treadle $m^3$, which, being connected with the clutch-shipper and the dog, lifts the dog from the notch in the index-wheel, and engages the clutch with the clutch-pulley, setting the worm and worm-wheel in motion to operate the reel. The pressure being removed from the treadle, the weight disengages the clutch from the clutch-pulley when the bread-holder arrives at the proper position at the oven mouth, (the dog having dropped into the corresponding notch in the index-wheel,) and the bread-holder is stopped and held in such position until the mechanism is again set in operation.

I do not wish to limit my invention to the precise construction of the above-described mechanism, because it is obvious that a pin-wheel, working with a notched lever, could be used in place of the index-wheel to a good purpose; and it is also evident that the treadle may be dispensed with, and the clutch-shipper operated by various well-known mechanical connections, from the front of the oven. Moreover, I do not wish to confine myself to placing the index-wheel upon the reel-shaft, because it may be placed upon any shaft connected with the reel, by positive gear, with good result. Neither do I wish to limit my invention to the employment of an index-wheel with adjustable notches, because one that is regularly spaced will be better than none. If the index-wheel be geared to the wheel-shaft, it may have a greater or lesser number of notches, depending upon the gear. When the reel is operated by a worm and worm-wheel, the worm holds the bread-holders in place wherever they may be when the clutch is thrown off, and therefore, the dog, in such case, may be used with the index-wheel, merely to regulate the time of releasing the clutch-connection; but if the reel were worked by a pinion and spur-wheel, the dog must be strong enough to hold the reel.

I claim, as my invention and improvement in bakers' reel-ovens—

The combination of an automatic stop-mechanism, substantially as herein described, with the reel and bread-holders of a baker's reel-oven, and the mechanism for moving the same, the combination being substantially as herein described, whereby the bread-holders are moved forward and stopped, and held at the proper place at the oven mouth for discharging and recharging.

Also, in the above-specified combination, making the index-wheel, which constitutes a part of the stop-motion, with adjustable stops, adjusted to give the required position of the bread-holders at the mouth of the oven.

ALEXANDER CRUMBIE.

Witnesses:
 JOHN R. TREADWELL,
 A. H. BOWMAN.